W. ADAMSON.
Mash Apparatus.
No. 25,311. Patented Sept. 6, 1859.
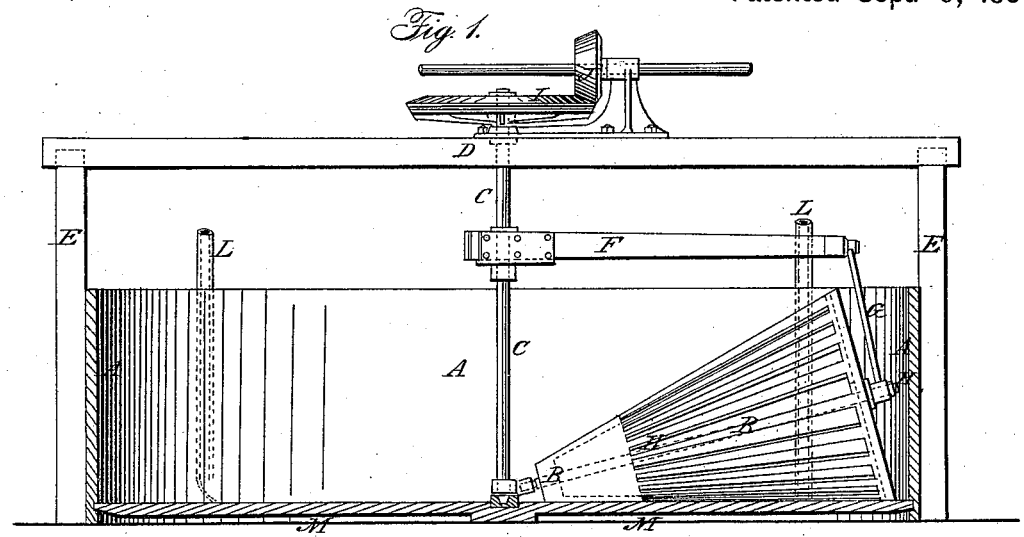
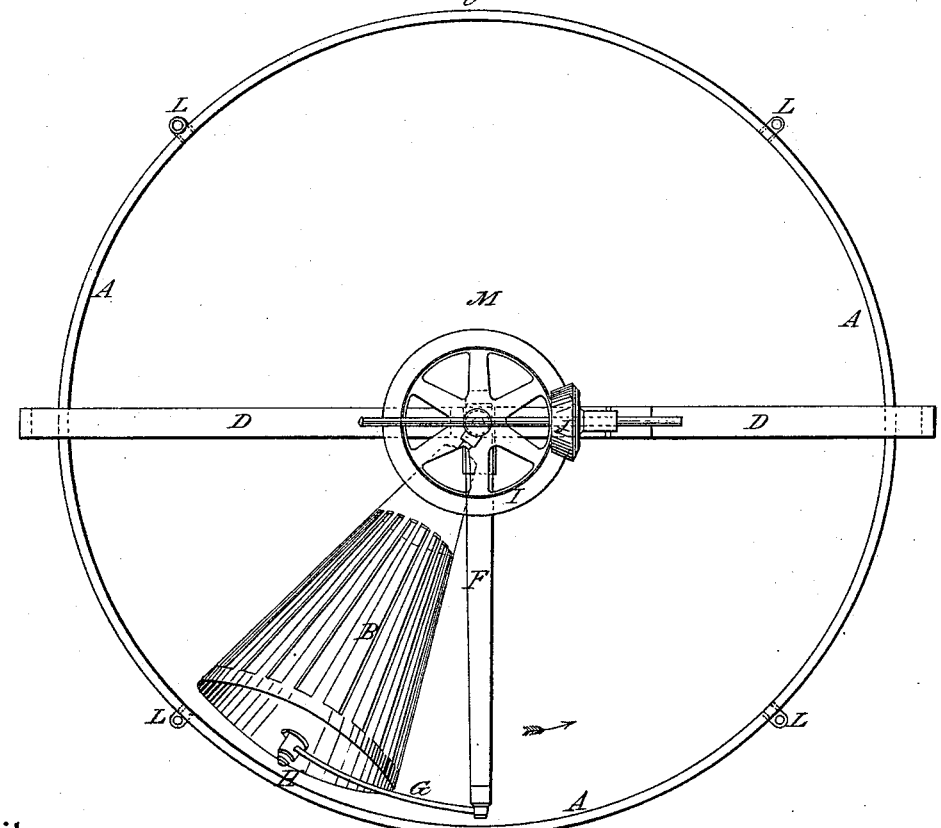
Witnesses:
Inventor:

UNITED STATES PATENT OFFICE.

WILLIAM ADAMSON, OF PHILADELPHIA, PENNSYLVANIA.

APPARATUS FOR MAKING DECOCTIONS.

Specification of Letters Patent No. 25,311, dated September 6, 1859.

*To all whom it may concern:*

Be it known that I, WILLIAM ADAMSON, of the city and county of Philadelphia and State of Pennsylvania, have invented a new and useful Improvement in Boiling Apparatus; and I do hereby declare that the following is a full, clear, and exact description thereof, reference being had to the accompanying drawings, and to the letters of reference marked thereon.

Figure 1, is a vertical section through the boiler showing the interior of the same, and Fig. 2, presents a plan of the boiler.

The nature of my invention consists in placing within a circular tank or boiler a conical roller made either solid, or open, as shown by the drawings and revolving the same during the process of boiling for the purpose of thoroughly intermixing the ingredients to be extracted by the water or other fluid, by keeping them always agitated and stirring,—such for instance as soap, glue, and extracting coloring matter from dye-wood, etc.

The boiler or tank A, may be made of any capacity according to its requirements, say for instance 12 feet in diameter and 4 feet deep; in the bottom of this is a conical roller B, made up of slats and open, or it may be made solid if desirable, but it is preferable to have it made as shown in Figs. 1 and 2, in order to spread the stuff from the center to the circumference where the roller is the heaviest. This conical roller is pivoted at its apex to a vertical shaft C, which has its upper bearing in a cross piece D, supported by two uprights E, E.

The roller is put in motion by an arm F, made either of wood or metal, projecting from and secured to the upright shaft C, and conecting rod G, in the lower end of which the conical roller B, is pivoted by a shaft H, extending through it. Motion may be given to the vertical shaft C, by crank motion or by bevel wheels I, J, and the whole put in operation by the application of steam or other motive power.

The pipes L, L, L, L are for the purpose of letting in steam among the contents of the tank. They are let in through the curb of the tub. The tub may be made of metal and the heat applied directly to the bottom M.

The operation is as follows: The materials for soap, glue, etc, are put in the tank. Steam or fire direct is applied to boil and as soon as the mass becomes warm the roller is set in motion which thoroughly mixes the ingredients and thoroughly washes out or squeezes out the extracts with great facility.

This process gives to the articles a thorough mixing and economizes heat, labor and time,—also saves very much in the extra quantity it is capable of extracting from any thing boiled for that purpose or agitated while boiling.

What I claim as new and desire to secure by Letters Patent, is,

The conical roller arranged within the caldron A, when the same is used for the purpose of thoroughly intermixing the ingredients to be extracted during the process of boiling as herein set forth.

WM. ADAMSON.

Witnesses:
W. M. SCOTT,
E. PANCOAST MORRIS.